United States Patent [19]

Penn

[11] 4,221,311
[45] Sep. 9, 1980

[54] BUMPER GUARD LUGGAGE CARRIER

[76] Inventor: Silas Penn, 5316 Sheridan, Detroit, Mich. 48213

[21] Appl. No.: 39,809

[22] Filed: May 17, 1979

[51] Int. Cl.² .................................................. B60R 9/06
[52] U.S. Cl. .......................... 224/42.08; 224/42.03 R; 224/42.44
[58] Field of Search ............... 224/42.08, 42.03 R, 224/282, 42.44, 42.21, 42.03 A; 293/114, 106

[56] References Cited

U.S. PATENT DOCUMENTS

| | | | |
|---|---|---|---|
| 1,808,042 | 6/1931 | Kennedy | 224/42.21 X |
| 1,976,146 | 10/1934 | Self | 224/42.44 |
| 3,202,332 | 8/1965 | Walker | 224/42.08 X |
| 4,125,214 | 11/1978 | Penn | 224/42.08 |

*Primary Examiner*—Steven M. Pollard
*Attorney, Agent, or Firm*—Hauke and Patalidis

[57] ABSTRACT

A luggage carrier comprising a pair of spaced apart bumper guards for mounting on the bumper of a motor vehicle, a luggage rack frame mounted between the bumper guards, said luggage rack frame being mounted such as to be pivotable on an axis parallel to the bumper from a horizontal position to a vertical storage position and further being removably mounted to one of said bumper guards and hingedly mounted to the other of said bumper guards so as to be pivotable about a substantially vertical axis from the horizontal use position to a horizontal removal or curb loading position allowing trunk or tailgate access.

10 Claims, 9 Drawing Figures

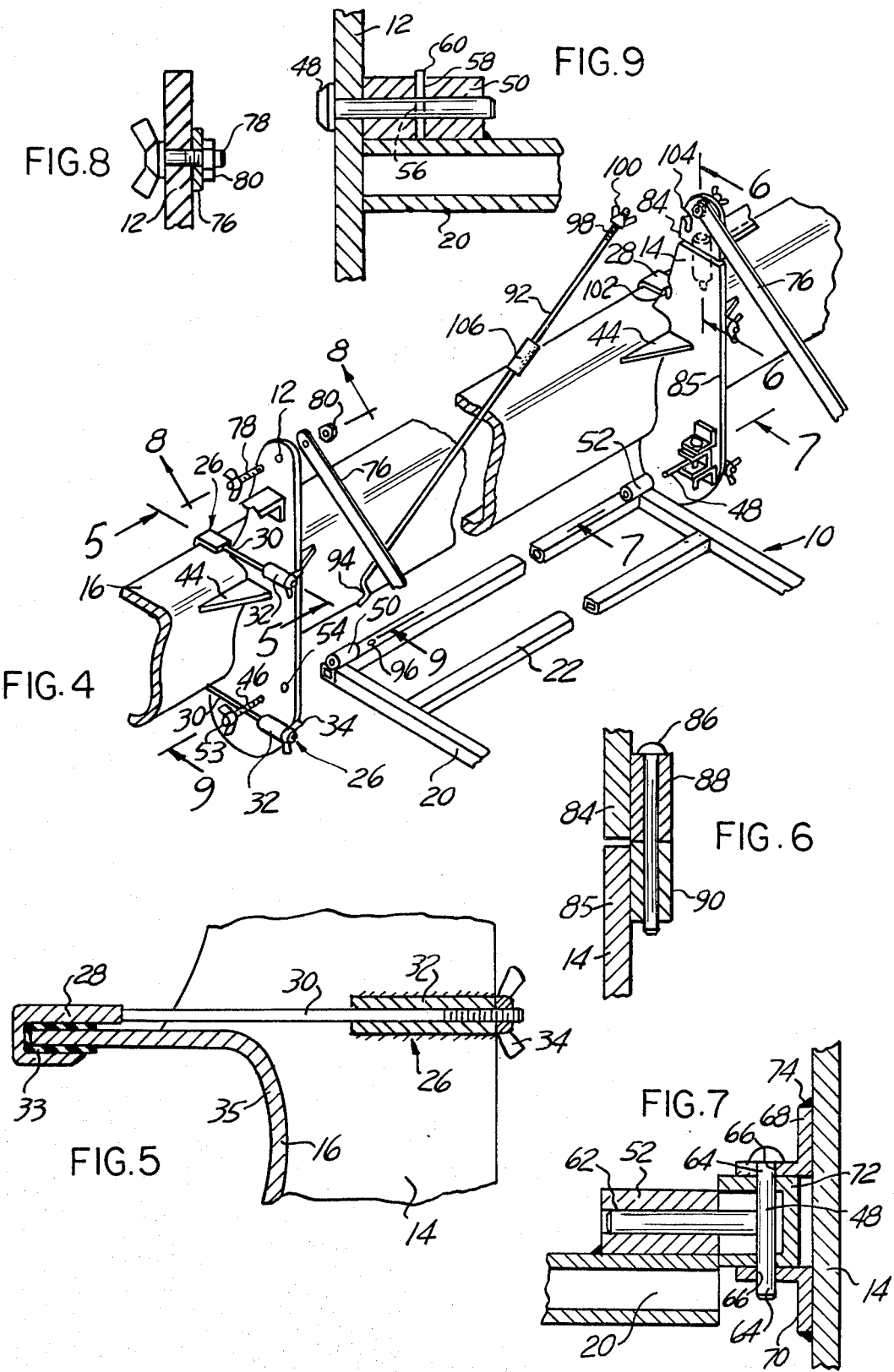

BUMPER GUARD LUGGAGE CARRIER

CROSS-REFERENCE TO RELATED PATENTS

This application represents an improvement to the bumper guard luggage carrier disclosed in U.S. Pat. No. 4,125,214.

BACKGROUND OF THE INVENTION

The use of luggage carriers to increase the cargo carrying capacity of motor vehicles has become quite widespread, particularly since motor vehicle manufacturers have begun producing smaller and smaller vehicles in an attempt to reduce fossil fuel consumption. Most luggage carriers in use today mount either on the roof or the rear deck of the vehicle.

In my earlier related U.S. Pat. No. 4,125,214, I disclose a bumper-mounted luggage carrier consisting of a pair of upright laterally spaced bumper guards secured to the bumper with, for example, a U-shaped rack frame pivotally mounted between the bumper guards allowing the luggage rack to be pivoted from a horizontal use position to a substantially vertical storage position. The rack is provided with lateral and horizontal reinforcements to stabilize it while the rack is in motion. The bumper guard luggage rack disclosed in that patent provided a useful option for the motor vehicle, but it presents some difficulties in installing or removing. Furthermore, the embodiment disclosed therein made no provision for convenient curb side loading of the racks or for accommodating access to the trunk hatchback door or tailgate of the vehicle, thus making it inconvenient or impossible, for example, to get to the spare tire in the event of a flat tire without removing the luggage and possibly the whole rack.

The present invention is an improvement in the structure disclosed in said patnet, which provides a bumper mounted luggage carrier which may be rapidly and manually mounted to a conventional rear bumper and which may be easily pivoted by each of a pair of axes, one parallel to the bumper and one parallel to the bumper guard, such as to allow pivoting of the carrier frame between a vertical storage position, a horizontal trunk access and curb loading position, and a horizontal use position.

SUMMARY OF THE PRESENT INVENTION

The present invention relates to luggage carriers and more particularly to rear bumper mounted bumper guard luggage carriers. The present invention is addressed to a luggage carrier improved by providing removable clamps on each of the bumper guards to facilitate rapid manual attachment and removal of the rack, and by providing means for pivoting the rack about a substantially vertical axis to allow convenient curb loading and unloading of the cargo on the rack and to facilitate access to the trunk or other rear storage compartment of the vehicle. Pivoting means may consist, for example, of a removable pivot pin attaching one bumper guard to the rack and a hinged pin securing the other side of the rack to the other bumper guard. The many objects and advantages of the present invention will become clear to those skilled in the art when the following description of the best mode contemplated for practicing the invention is read in conjunction with the drawing wherein like reference numerals refer to like components throughout and wherein:

BRIEF DESCRIPTION OF THE DRAWING

FIG. 4 is a partly exploded perspective view of the bumper guards thereof;

FIG. 5 is a cross-sectional view taken along line 5—5 of FIG. 4;

FIG. 6 is a cross-sectional view taken along line 6—6 of FIG. 4;

FIG. 7 is a cross-sectional view taken along line 7—7 of FIG. 4;

FIG. 8 is a cross-sectional view taken along line 8—8 of FIG. 4; and

FIG. 9 is a cross-sectional view taken along line 9—9 of FIG. 4.

DETAILED DESCRIPTION OF THE PREFERRED EMBODIMENT

Figure 1:
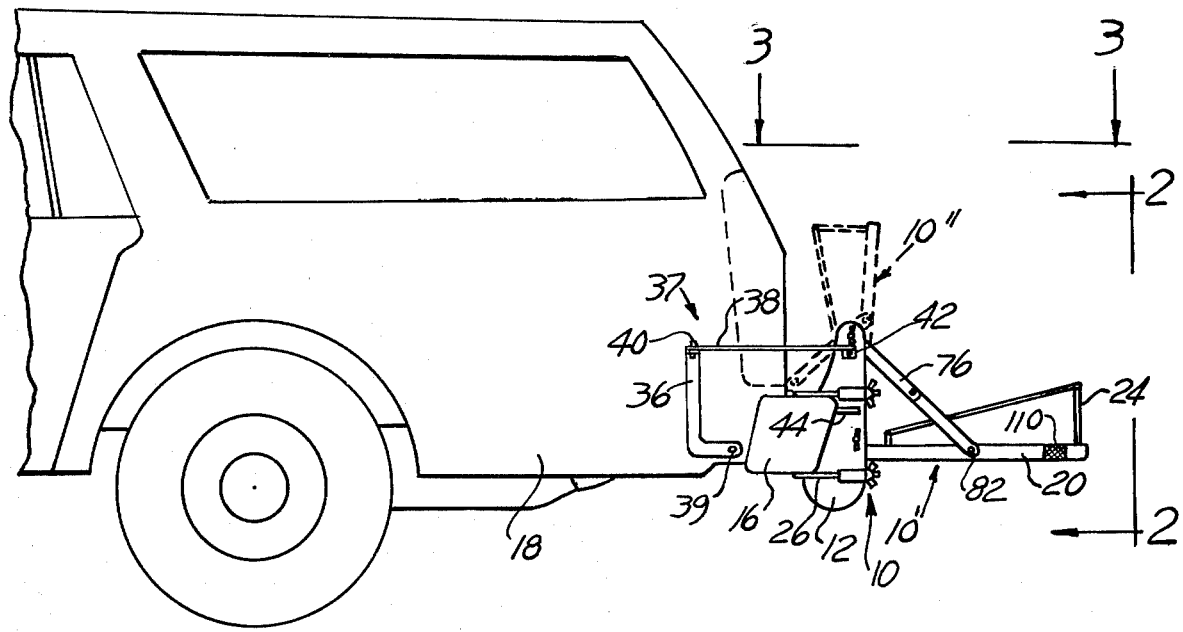
FIG. 1 is a side view of a luggage rack according to the present invention mounted on the rear bumper of a motor vehicle.
Figure 2:
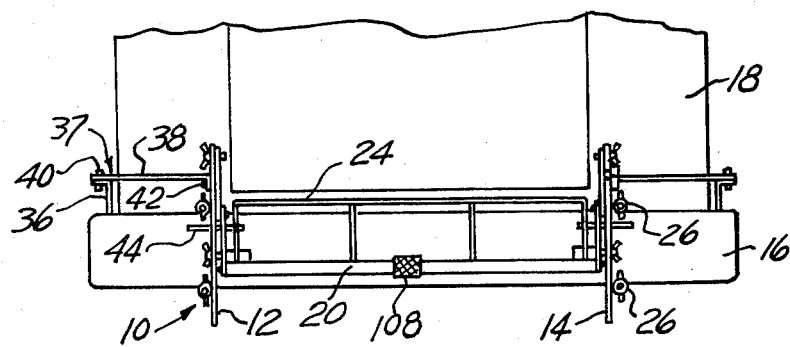
FIG. 2 is a view from line 2—2 of FIG. 1.
Figure 3:
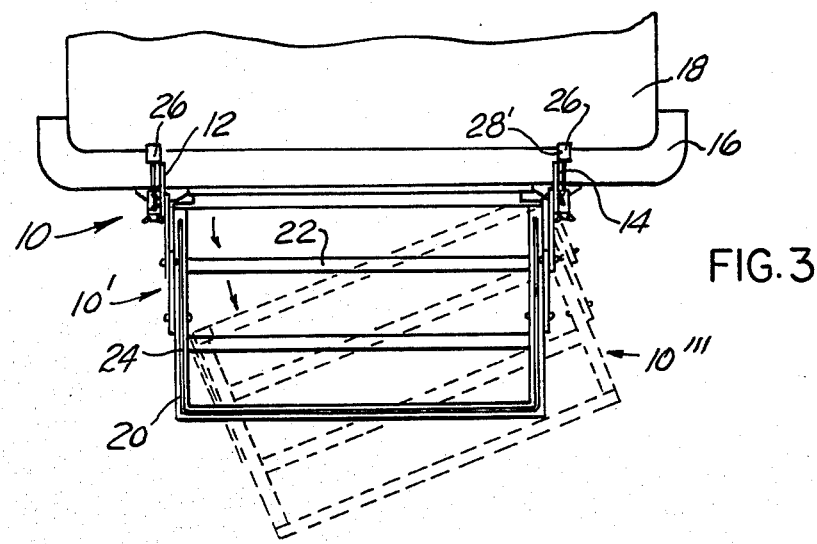
FIG. 3 is a view from line 3—3 of FIG. 1.

Referring now to the drawing, FIGS. 1-3 show an example of a luggage carrier 10 according to the present invention mounted by means of a pair of bumper guards 12 and 14 to the bumper 16 of a motor vehicle 18. The luggage carrier 10 is shown in FIGS. 1 and 3 in solid line in its horizontal use position 10', in phantom line in its vertical storage position 10", and in phantom line in its curb loading position 10'''.

The luggage carrier 10 consists of a rectangular rack bed 20, formed, for example and as shown, of four hollow metallic bars or, alternatively, from a single extrusion, and has a number of cross members 22, also made of hollow metallic bars, or of flat sheet metal extending between the opposite sides of the rack bed 20. A railing 24 is provided to at least partly surround the cargo, not shown, loaded on the rack frame 20. Further securing means such as a strap may be provided, as needed.

In the preferred embodiment each bumper guard 12 and 14 is a thick elongated plate mounted perpendicular to the bumper 16 by means of a pair of clamps 26 shown best in FIGS. 4 and 5. Each clamp 26 consists of a hook portion 28 designed to wrap at least partly around the sheet metal of the bumper 16 and, a threaded rod 30 welded thereto. Welded to the bumper guards 12 and 14 are short cylindrical pipe sections 32 through which the threaded rod 30 passes. A wing nut 34 threaded on the end of rod 30 draws the threaded rod 30 and thus the hook 28 rearwardly towards the tubular section 32 so as to clamp the bumper guards 12 and 14 to the bumper 16. The hook portion 28' on the clamp 26 for the right bumper guard 14 has to carry the full weight of the luggage and the luggage rack 10 when the rack is pivoted towards the curb and therefore is preferably at least four inches wide. The hook portion 28 on the left bumper guard may be identical, for simplicity in mass producing the luggage rack or, alternatively, may be smaller and thus require less material since it will not have to support as much weight as the other clamp.

An alternative configuration, not shown, using fewer components and requiring fewer manufacturing steps may be used wherein the pipe 32 is replaced by a substantially circular passageway formed in the bumper guard 12 or 14 by a stamping operation forming alternating undulations, several such undulations being required to keep the shaft 30 from pivoting and thus loosening the clamp. For stability, four clamps 26 are used, one for wrapping around the top and one for wrapping around the bottom of the bumper 16 for each bumper guard 12 and 14.

A pad 33 of cushioning material may be provided between the hook portion 28 and the bumper 16 to reduce the tendency of the hook to dent or mar the bumper, and to absorb some of the energy of impact in a low speed collision, such as occurs frequently when backing into a parking space. Each bumper guard 12 or 14 has an arcuate recess 35 adapted for cooperative registry with the bumper 16, which may also be protected by a cushioning pad, not shown in the drawing. The cushioning pad 33 may be formed from an elastomeric material, such as rubber.

The bumper guards 12 and 14 may be further stabilized and positioned on the bumper 16, for example, by means of a horizontal stabilizer 37 mounted to the side of the vehicle 18 as shown in FIGS. 1 and 2. In the example shown, the horizontal stabilizer 37 consists of a first bar 36 mounted to the side of the vehicle 18 at a point 39 on the fender of the vehicle 18 or on the bumper 16 and a second bar 38 secured at its ends, for example by pins 40 and 42, to the bar 36 and the bumper guard 12 or 14 respectively. Additional stability is provided for each bumper guard by provision of flanges 44 welded, for example, perpendicular to each face of each bumper guard so as to press against the bumper 16 and prevent pivoting of the bumper guard 12. The flanges 44 may, alternatively, be formed from a resilient material such as rubber to act as a shock absorber.

The base frame 20 of the luggage rack 10 is pivotally mounted between the bumper guards 12 and 14 by means of a pair of pins 46 and 48 extending from the bumper guards 12 and 14 and a pair of short cylindrical pipe sections 50 and 52 welded to the frame 20. The pin 46 securing the left bumper guard to the rack bed 20, for example and as shown in FIG. 4, is a threaded stud provided with a wing nut head 53 for manual attachment. It passes through a clearance hole 54, and is threaded into a mating internal thread within pipe section 50. Alternatively, as shown in FIG. 9, stud 48 and pipe section 50 may each be provided with a small hole 56 and 58 both accepting the leg of a cotter pin 60.

Pin 48 on the right bumper guard 14 is a T-shaped member, best shown in FIG. 7. The leg 62 of the T passes through the pipe section 52 and the arms 64 of the T pass through holes 66 in a pair of brackets 68 and 70, each welded at 74 to bumper guard 14. As shown, an intermediate U-shaped stamping 72 is provided between brackets 68 and 70 to position the rack 20 with respect to the bumper guard 14 and to act as a bearing between the brackets 68 and 70.

The rack is further secured to each bumper guard by means of a pair of folding linkages 76, each secured, for example by a threaded stud 78 and a nut 80 at a point substantially above of the height of the bumper 16 to the bumper guard 12 or 14 and at the other end, for example, by the stud 82 to the side to a side of the rack bed 20. The nut 80 may be welded to the linkage 76 to prevent its loss. The right bumper guard, 14, is cut into two pieces below stud 78. The upper portion, 84, of the bumper guard is hingedly connected to the lower portion 85, for example and as shown in FIG. 6, by means of a stud 86 passing through a pair of short cylindrical pipe sections 88 and 90 each welded to a part of the bumper guard 84 or 85.

FIG. 4 illustrates a means by which the luggage rack 10 may be stabilized still further when in the curb loading position. A stabilizing rod 92 provided on one end with a doubly bent end portion 94 is inserted into a hole 96 through the luggage rack frame 20 proximate the left bumper guard 12. Alternatively, the end 94 of the rod 92 may be threaded and secured to the frame 20 with a wing nut, not shown. The other end 98 is preferably threaded and provided with a wing nut 100. Small horizontal slots 102 and 104 are provided respectively on portions 84 and 85 of bumper guard 14 each accepting rod 92. Thus, the rod 92 will usually be fastened to at slot 102 by tightening wing nut 100 when the rack is in either the vertical storage position 10" or the horizontal use position 10' without interfering with folding linkage 76. When curb loading or trunk access is desired, the rod 92 may be rapidly unfastened, pivoted into slot 104, and refastened while the rack is in the horizontal use position 10'. In this position, when the pin 46 is removed, the stabilizing rod 92 will support the cantilevered end of the luggage rack, and thus keeping rod section 50 in line with pin hole 54 for ease of reassembly. Along the stabilizing rod 92 may be slidably positioned one or more cylindrical sections of energy absorbing material 106 so as to prevent the rod from banging against the bumper, thus preventing both damage to the bumper and noise. Furthermore, the rod 92, as shown in FIG. 4, may be rapidly removed from the rack if currently not needed or desired.

As can be seen from the description and from the drawing, the luggage carrier 10 of the present invention may be rapidly attached to or removed from the rear bumper 16 of a motor vehicle 18, the only non-manual operation required being the drilling of a mounting hole 39 for the horizontal stabilizer 37, without permanently altering the appearance of the vehicle. This is particularly true if the mounting hole 39 is hidden behind a wrap-around portion of the bumper 16, and if a cushioning pad 33 is affixed between the hook portion 28 of the clamp 26 and the bumper 16 to protect the bumper from damage.

Once assembled to the vehicle, the rack 10 will freely pivot on the horizontal axis defined by the pins 46 and 48 between horizontal use position, 10' in which position the folding linkages 76 are fully extended, and a vertical non-use storage position 10". For curb loading and trunk or tailgate access, threaded studs 78 and 46 on the left bumper guard 12 are removed so as to free the luggage rack 10 to hinge on the vertical axis defined by the pivot pin 86 and the arms 66 of pivot pin 48 from the horizontal use position 10' to the horizontal curb loading position 10'''.

The safe use of the luggage rack 10 of the present invention may be greatly enhanced through the use of optional lighting, wired to and controlled with the vehicle's own lighting, for example, or, alternatively, independently controlled and powered by its own, self-contained, battery. At last one safety light or reflector is preferably located at the rear of the luggage rack frame 22, as shown at 108 at FIG. 2 and on each side of the rack frame, as shown at 110 at FIG. 1.

Having thus described the present invention by means of an example of structural embodiment thereof, modifications whereof will be obvious to those skilled in the art, what is claimed is as follows:

1. A luggage carrier for a motor vehicle having a rear bumper comprising a first and a second upright laterally spaced bumper guard bearing against said bumper, each bumper guard comprising an elongated body, an arcuate recess in the forward edge of said elongated body adapted for cooperative registry with said bumper, means securing said elongated body to said bumper, a rack frame having side members and a series of parallel spaced crossbars, one end of said frame bearing against and interposed between said guards, said frame being pivotally mounted to said guards, pivotal linkage means supporting said frame in a horizontal use position and permitting upward tilting of the frame to a vertical non-use storage position, and wherein said rack is removably mounted to said first bumper guard and hingedly mounted to said second bumper guard such that said rack is hingeable on an axis parallel to said second bumper guard from a horizontal use position to a horizontal curb-loading position.

2. The luggage carrier of claim 1 wherein said rack is removably and pivotally mounted to said first bumper guard by means of a threaded stud removably threaded into a hole in said rack parallel to said bumper, said stud being secured within said hole by a cotter pin.

3. The luggage carrier of claim 1 wherein said means securing said elongated body to said bumper comprises at least one clamping member with an end hooked partly around said bumper and means affixing said hook member to said bumper guard.

4. The luggage carrier of claim 3 wherein a pad of cushioning material is disposed between said hooked end and said bumper.

5. The luggage carrier of claim 1 wherein said means affixing said hook member to said bumper guard comprises a threaded rod affixed to said clamping member, a hole in said bumper guard, said threaded rod being passed partly through said hole, and a nut threaded on said rod drawing said guard towards said bumper.

6. The luggage carrier of claim 5 comprising four each of said clamping members, threaded rods, and nuts, one for mounting to the top of said bumper and one for mounting to the bottom of said bumper from each said bumper guard.

7. The luggage carrier of claim 1 wherein said rack is pivotally and hingedly mounted to said second bumper guard by means of a two-directional hinge comprising a mounting bracket extending from said second bumper guard and a T-shaped pin having a leg and two arms, said arms being inserted into holes in said mounting bracket, and said leg being inserted into a hole in said rack frame parallel to said bumper.

8. The luggage carrier of claim 1 wherein said pivotal linkage means comprises a folding pivotal linkage having two ends, the first end being fastened to one of said side members and at the second end being fastened to the upper end of one of said bumper guards.

9. The luggage carrier of claim 8 wherein said linkage is removably connected to said first bumper guard.

10. The luggage carrier of claim 8 wherein said second bumper guard comprises an upper portion and a lower portion, said upper portion being hingedly affixed to said lower portion such as to pivot on a substantially vertical axis, and wherein said second end of said linkage is connected to said upper portion.

* * * * *